United States Patent [19]
Martin et al.

[11] 3,767,066
[45] Oct. 23, 1973

[54] PORTABLE FREIGHT SPACER

[75] Inventors: Vincent F. Martin; Richard J. Woolverton; Rodger H. Kuhlmann, all of St. Louis County, Mo.

[73] Assignee: M.K.W. Industries, Incorporated, St. Louis, Mo.

[22] Filed: Dec. 8, 1971

[21] Appl. No.: 205,898

[52] U.S. Cl.......... 214/10.5 R, 105/367, 105/369 S, 105/369 UL
[51] Int. Cl............................................. B65g 1/14
[58] Field of Search.................. 214/10.5 R; 229/15; 105/367, 369 UL, 369 S, 369 R, 369 B

[56] References Cited
UNITED STATES PATENTS

| 3,534,691 | 10/1970 | Carlomagno, Jr. | 105/369 B |
| 1,608,918 | 11/1926 | Alexander | 214/10.5 R |
| 2,184,258 | 12/1939 | Nickerson | 229/15 X |
| 1,963,545 | 6/1934 | Campbell et al. | 105/369 D |
| 3,424,108 | 1/1969 | Vargen | 105/367 X |

Primary Examiner—Robert G. Sheridan
Assistant Examiner—Frank E. Werner
Attorney—Ralph W. Kalish

[57] ABSTRACT

A portable spacer for disposition between freight units within a compartment to prevent shifting of such units during transit, comprising a substantially hollow block having internal supports for rigidifying same in operative position. Said block is fabricated of lightweight material and adapted for collapsing when in disuse; and being devoid of any means for attaching same to the freight containing structure.

8 Claims, 6 Drawing Figures

PATENTED OCT 23 1973 3,767,066

INVENTORS
VINCENT F. MARTIN,
RICHARD J. WOOLVERTON, &
RODGER H. KUHLMANN

BY Ralph W. Kalish

ATTORNEY

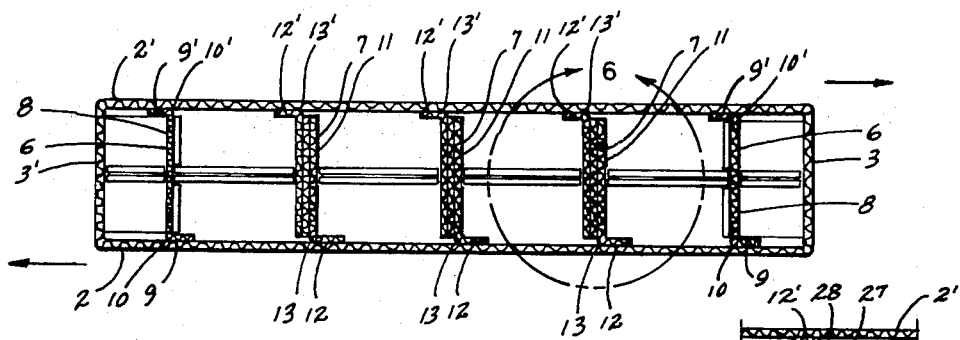
FIG. 3
FIG. 6
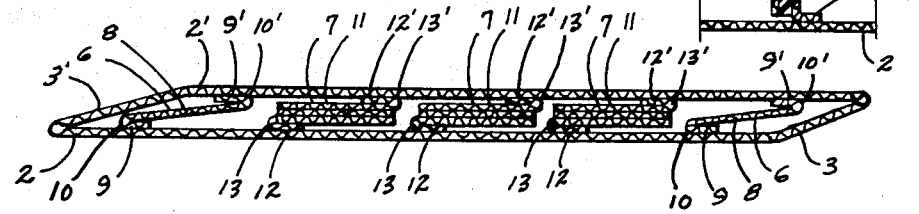
FIG. 4
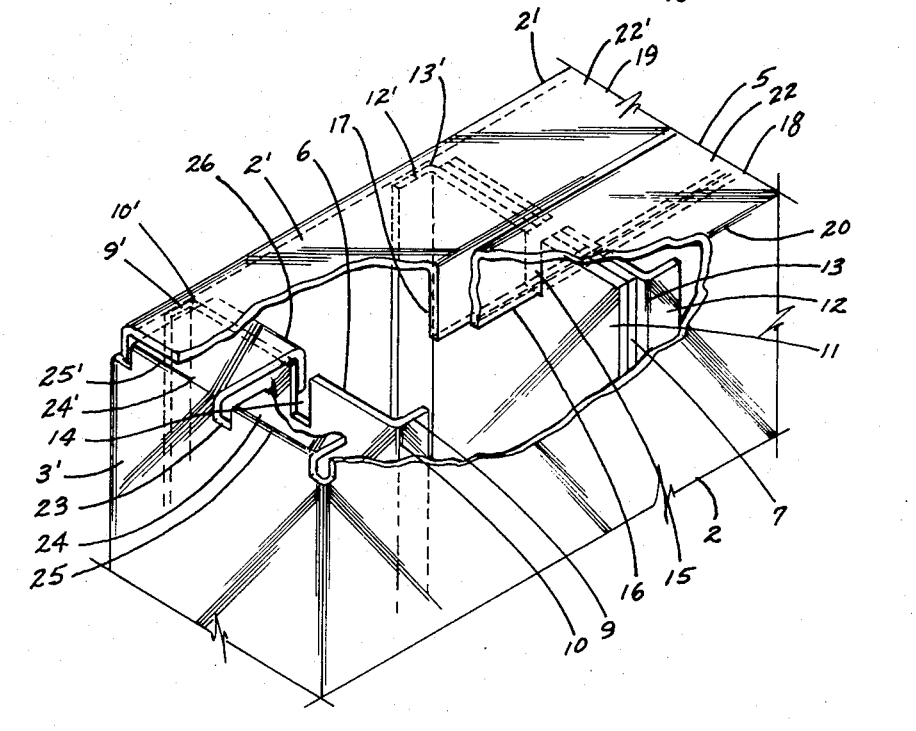
FIG. 5
INVENTORS
VINCENT F. MARTIN,
RICHARD J. WOOLVERTON, &
RODGER H. KUHLMANN
BY Ralph W. Kalish
ATTORNEY

PORTABLE FREIGHT SPACER

BACKGROUND AND SUMMARY OF THE INVENTION

This invention relates generally to cargo carriers, such as, freight cars, automobile, truck, or trailer vans, and the like, and, more particularly, to a portable spacer for stabilizing cargo which does not fill the particular freight compartment so as to stabilize the same against inadvertent, potentially damaging movement during travel.

Heretofore, various efforts have been expended attempting to develop devices for disposition within freight-receiving compartments to fill the unused portions thereof in order that the cargo may be maintained in relatively compact condition, proof against damage through displacement in transit as caused by shock developed from the particular vehicle's movement. Such devices have been customarily relatively costly and complex; being adapted for securement in one fashion or another to the compartment structure, such as the side walls or overhead. Side or wall fillers for railway cars are exemplary of these efforts wherein the same are secured upon the side walls of the freight compartment and incorporate means for being disposed in adjusted relationship thereto depending upon the empty volume to be filled. Side and wall fillers of this type are part of the permanent construction of the freight cars. Fillers of this type are disclosed in the Loomis et al, U.S. Pat. No. 3,392,683; Kostrewa U.S. Pat. No. 3,344,750; and Erickson U.S. Pat. No. 3,345,955. Other attempts have comprehended load dividers as being engaged at their ends to the opposed side walls of cargo moving bodies or to the overhead and floor thereof. Dividers or separators of this character are shown in Magarien et al, U.S. Pat. No. 3,063,388; Robertson U.S. Pat. No. 3,212,458; and Bezlaj Reissue U.S. Pat. No. Re. 27,037.

Therefore, it is an object of the present invention to provide a spacer for disposition between freight units for maintaining same in firm, shift-resistant disposition within the particular compartment and which spacer is independent of, being unattached to, any portions of the hauling vehicle structure.

Another object of the present invention is to provide a spacer of the type stated which is fabricated of relatively inexpensive materials, being of simple construction and readily disposed in operative position without the exercise of mechanisms or other control units as requisite with current load spacers and side fillers.

It is a further object of the present invention to provide a spacer of the character stated which is of lightweight so as to be easily handled by the average individual; and which is of knock-down character so that the same may be optionally collapsed for storage in minimum space when in disuse.

It is a still further object of the present invention to provide a spacer of the character stated which is durable and reliable in operation; which is so cheaply manufactured that the same could be discarded after a single freight run without the sustention of any recognizable economic loss; and which is of simple construction so as to be readily assembled for operative use, and as readily disassembled.

BRIEF DESCRIPTION OF THE DRAWINGS

FIG. 3 is a horizontal transverse sectional view taken on the line 3—3 of FIG. 2.

FIG. 4 is a horizontal transverse sectional view taken substantially on the line 3—3 of FIG. 2 but illustrating the spacer in collapsed or knock down condition.

FIG. 5 is an enlarged fragmentary perspective view of the spacer in operative condition, with a portion of the top wall being broken away.

FIG. 6 is an enlarged fragmentary horizontal transverse sectional view taken within the indicated zone in FIG. 3 and illustrating another form of cross brace.

DESCRIPTION OF THE PREFERRED EMBODIMENT

Figure 1:
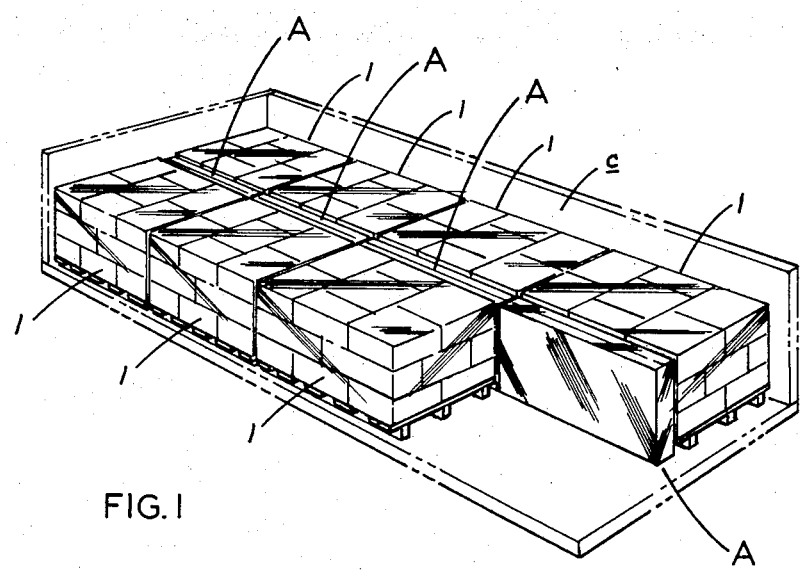
FIG. 1 is a perspective view of a stylized freight compartment equipped with a freight spacer constructed in accordance with and embodying the present invention, illustrating the spacer in operative position between freight units.
Figure 2:
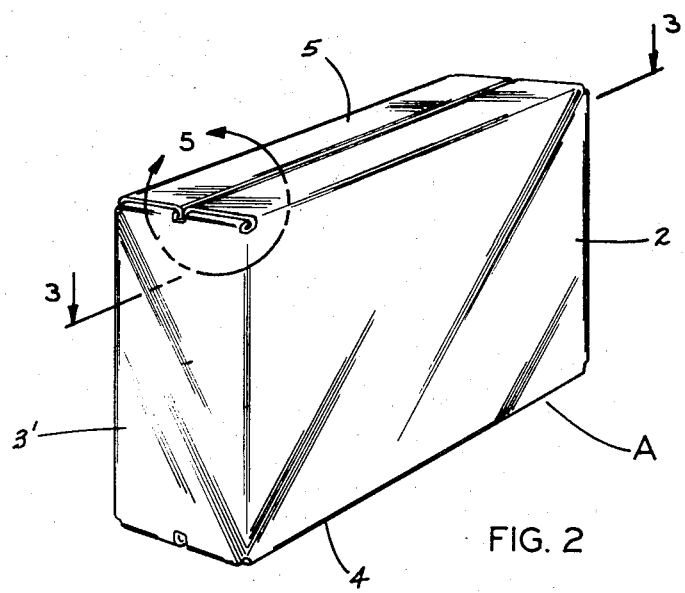
FIG. 2 is an enlarged perspective view of the spacer in assembled, operative condition.

Referring now by reference characters to the drawings which illustrate the preferred embodiment of the present invention, A generally designates a spacer for interposition between freight units as exemplified by the pallet loads, indicated at 1 in FIG. 1, within a cargo-receiving compartment designated c as incorporated in a freight hauling vehicle, such as railway cars, automobile, truck or trailer vans, aircraft and the like. Spacer A is of general block character and being fabricated preferably of corrugated paper, having parallel side walls 2,2', parallel end walls 3,3', a bottom wall 4, and a top wall 5. The dimensions of spacer A are determined by the particular volume to be filled. The particular form of the invention illustrated in the drawings wherein the maximum dimension is lengthwise is dictated by the volume of the unfilled space within customary truck trailers when a double row of loaded pallets are being transported. It has been found that the width of such trailers is somewhat greater than twice the width of the loaded pallets. But it is indeed obvious that spacer A could be easily dimensioned to occupy whatever empty zone might result from accommodating particular loads. Thus, in the present instance, the height of spacer A is substantially the same as that of the pallet load so that the individual load units, such as cases of bottle goods and the like, are accorded appropriate lateral support and thus inhibited against shifting with attendant breakage which has been usual and expected heretofore. Extending between side walls 2,2' spacedly throughout the length of spacer A is a pair of end cross braces 6 and intermediate, reinforced cross braces 7. It is manifest that the number of intermediate cross braces 7 is a function of the length of spacer A so that side walls 2,2' are suitably supported in operative position. Each end cross brace 6 is of relatively reduced thickness, being formed from a single panel of the particular corrugated paper stock, having a like height as end walls 3,3', but being of greater transverse extent. Each end cross brace 6 is suitably formed to provide a central panel 8 with side flaps 9,9' extending in opposite directions from the lateral edges of said panel 8, as from coincident lines of fold, indicated 10,10', respectively. Said flaps 9,9' are secured as by adhesives, stapling and the like, flatwise upon the confronting portion of side walls 2,2', respectively, and thereby establish fold lines 10,10' as hinge axes so that said cross braces 6 are adapted for operative positioning wherein the panels 8 thereof are in planar parallel relationship to end walls 3,3' (see FIG. 3), or in inoperative position when spacer A is collapsed causing panel 8 to planarwise assume an angle of substantially less than 90° with respect to the planes of side walls 2,2' (FIG. 4). Intermediate cross braces 7 are of generally like construction as end braces 6 having a central panel 11, side flaps 12,12' and associated fold line 13,13'. However, panel 11 is of reinforced character, such as being formed from a multiplicity of plies of corrugated paper stock; there being three such plies shown in the drawings, and with the same being mutually united, as by suitable adhesives. By reason of the number of plies, it is evident that the end flaps 12,12' will be formed from the opposed outer plies. Thus, intermediate cross braces 7 function in the same manner as end cross braces 6, being adapted for swinging between operative and inoperative position (see FIGS. 3 and 4) but differing from said end cross braces 6 in having a substantially thickened panel for enhancing the strength of spacer A to assure of reliable resistance against any applied forces through the shifting tendency of laterally supported load units.

Panels 8 and 11 of end cross braces 6 and 7, are provided with upwardly opening aligned recesses 14,15, respectively, in their upper central portions for snugly accepting the depending tongues 16, 17 of companion closures 18, 19 which constitute top wall 5. Each closure 18,19 is continuous with the proximate side wall 2,2', being coextensive therewith and developed by a line of fold or hinge line 20,21, respectively, constituting the normal upper limit of the related side wall 2,2'. Said closures 18 19 are provided with panel portions 22,22', respectively, having a transverse extent substantially half that of spacer A and with tongues 16, 17, respectively, being formed on their inner portions as by being turned at an angle of 90° to the plane of the related panel 22,22' for reception within the aligned recesses 14, 15. It is to be observed that said recesses 14,15 have a transverse extent substantially equal to the combined thickness of tongue 16, 17 so that the latter are held tightly therein; said recesses 14, 15 being of such depth as to cause panels 22,22' of closures 18, 19, respectively, to be presented within a plane perpendicular to side walls 2,2' when spacer A is in operative position and with the under surface of said panels 22,22' being supported by the upper edges of said cross braces 6,7. Each end wall 3,3' in its upper portion is provided with an extension which is intermediately slotted lengthwise, as at 23, to establish a pair of closure flaps 24,24' developed by a first fold line 25, 25' coincident with the upper edge of related side wall 3,3' so that said flaps 24,24' may be bent inwardly of spacer A. Each flap 24,24' on its inner end is bent to present a normally downturned flange 26. Said flaps 24,24' are dimensioned to span the distance between the associated end wall 3,3' and the proximate end cross brace 6 with the respective flange being disposed on its normally inner face against the side of the panel 8 of the associated end cross brace 6 remote from the proximate end wall 3,3'. Said flaps 24,24' will underlie panels 22,22' of closures 18,19, respectively, and serve to prevent inadvertent premature pivoting of end cross braces 6.

Although not shown in the drawings, it is to be understood that the bottom of spacer A is of like construction as the top hereinabove described, having the same type of end flaps and closures, and with said latter being suitably interengageable with the lower portions of cross braces 6,7 by recesses or notches formed therein corresponding to recesses 14,15 above described. Accordingly, spacer A is thus preferably of symmetrical character.

By reason of the material of construction, the corners of spacer A, as between the side and end walls, are sufficiently flexible for establishing fold lines to permit spacer A to be collapsed into the condition illustrated in FIG. 4 wherein side walls 2,2' are brought toward each other slightly lengthwise offset.

Referring now to FIG. 6, another form of intermediate cross brace 27 is illustrated, being exemplary of further means for reinforcing such members. Brace 27 is in all respects similar to brace 7 except that the central ply 28 is of a different material than the outer plies and being secured to the same by any suitable glutinatious matter. In this embodiment said ply 28 is formed of styrofoam in lieu of corrugated paper and, thus, will tend to enhance the strength of such cross brace while not adding to the weight thereof.

It will be seen that with flaps 24,24' and closures 18,19, including their counterparts on the bottom of spacer A in engaged relationship with the end and intermediate cross braces, (as shown in FIG. 5) spacer A is in stable operative form representing a substantially hollow block, but with the walls thereof fully supported for resisting normally applied forces during use. By reason of the interlock of tongues 16,17 within recesses 14,15 and the described disposition of flange 26 relative to end braces 6, said cross braces 6,7 are locked against inadvertent pivoting about hinge lines 10,10', 13,13'.

In such fully assembled condition, spacer A, being relatively light, is easily handled by loading personnel and is disposed, as illustrated in FIG. 1, preferably within the space intervening between adjacent loaded pallets as on a cargo-carrying vehicle so as to maintain said pallets with their loads in stable condition and properly laterally buttressed against shifting of any of the load components. By reason of the use of spacer A, costly breakage normally as has occurred heretofore in such cargo carriers is entirely prevented, marking savings of startling proportions.

It will be noted that spacer A is a self-contained unit being readily portable and, hence, structurally independent of the associated freight compartment or any portion thereof so that the same can be easily located at any point within such compartment as might be desired.

The collapsibility of spacer A conduces to its commercial appeal in that when not in use the same may be stored in minimum space. Although the cost of production of spacers A is nominal as to render it economically feasible to dispose of same after a single transport, it has been found that the same are of sufficient strength so as to be easily reusable and, thus, further contributes to its economy in usage.

Having described our invention, what we claim and desire to obtain by Letters patent is -

1. A freight spacer for disposition between freight units during transit comprising a body having parallel side walls, parallel end walls, and parallel top and bottom walls, braces being provided interiorly of said body for extension between said parallel side walls, means securing said braces to said side walls, said braces being of substantially like height as said end walls and being spaced apart lengthwise of said body, said braces being provided with recesses in their end portions, said body being formed of sheet bendable stock and with said walls being determined by lines of bending, said top and bottom walls being each of two-part character having portions bendable into coplanar, body-closed condition and planar parallel body-open condition whereby in said last state said body may be collapsed along the lines of bending between said end walls and said side walls, each of said parts of said top and bottom walls having tongues formed at their free ends, said brace recesses being dimensioned for receiving the tongues of the parts of the proximate top and bottom walls for maintaining said body in closed condition.

2. A freight spacer as defined in claim 1 and further characterized by each of said braces having lines of fold adjacent their points of securement to the proximate side walls for movement into substantial planar parallel relationship therewith when said body is collapsed.

3. A freight spacer as defined in claim 2 and further characterized by each of said braces being of multi-ply character.

4. A freight spacer as defined in claim 3 and further characterized by each of said braces being of three-ply character with said outer plies being of like material, and an intervening ply of different material engaged therebetween, each of said outer layers being hinged at at least one of their ends to the proximate side wall.

5. A freight spacer for disposition between freight units during transit comprising a body having parallel side walls, parallel end walls, and parallel top and bottom walls, braces being provided interiorly of said body for extension between said parallel side walls, means securing said braces to said side walls, said braces having aligned recesses in their upper and lower edge portions, said top and bottom walls being each of two-part character having a main panel engaged along one edge to the adjacent side wall and with its opposite edge being free, a tongue provided on said free edge of each main panel and being in substantially planar perpendicular relationship to the related panel, said tongues being receivable within the recesses of said braces for maintaining said body in closed condition, each of said end walls having on their upper and lower edges a pair of closure flaps, the closure flaps at each end being spaced apart a distance substantially equal to the transverse extent of said brace recesses, and means for engaging each closure flap to the proximate brace in underlying relationship to the proximate top and bottom walls when said body is in closed condition.

6. A freight spacer as defined in claim 5 and further characterized by each of said end wall closure flaps having a main panel portion for extension longitudinally of said body when in closed condition, each such flap panel being of greater extent than the distance between the related end wall and the proximate brace, each closure flap having a flange in its portion remote from the related end wall, each such flange being substantially planarwise perpendicular to the flap panel and being receivable upon the side of the proximate brace remote from the related end wall.

7. A freight spacer as defined in claim 5 and further characterized by said body being formed of sheet bendable stock and with said walls being determined by lines of bending.

8. A freight spacer as defined in claim 7 and further characterized by each of said braces having lines of fold adjacent their points of securement to the proximate side walls for movement into substantial planar parallel relationship therewith when said body is collapsed.

* * * * *